United States Patent
Coleman et al.

(10) Patent No.: US 11,409,899 B2
(45) Date of Patent: Aug. 9, 2022

(54) CHANGE FINGERPRINTING FOR DATABASE TABLES, TEXT FILES, AND DATA FEEDS

(71) Applicants: Acxiom Corporation, Conway, AR (US); Arthur Coleman, Carmel Valley, CA (US); Martin Rose, Superior, CO (US); Tsz Ling Christina Leung, Foster City, CA (US)

(72) Inventors: Arthur Coleman, Carmel Valley, CA (US); Martin Rose, Superior, CO (US); Christina Tsz Ling Leung, Foster City, CA (US)

(73) Assignee: LiveRamp, Inc., San Francisco, CA (US)

( * ) Notice: Subject to any disclaimer, the term of this patent is extended or adjusted under 35 U.S.C. 154(b) by 660 days.

(21) Appl. No.: 16/076,158

(22) PCT Filed: Feb. 8, 2017

(86) PCT No.: PCT/US2017/017007
§ 371 (c)(1),
(2) Date: Aug. 7, 2018

(87) PCT Pub. No.: WO2017/139372
PCT Pub. Date: Aug. 17, 2017

(65) Prior Publication Data
US 2021/0192071 A1    Jun. 24, 2021

Related U.S. Application Data

(60) Provisional application No. 62/292,820, filed on Feb. 8, 2016.

(51) Int. Cl.
*G06F 21/62* (2013.01)
*G06F 16/11* (2019.01)
(Continued)

(52) U.S. Cl.
CPC ........ *G06F 21/6245* (2013.01); *G06F 16/125* (2019.01); *G06F 21/6272* (2013.01); *G06F 21/552* (2013.01); *G06F 21/577* (2013.01)

(58) Field of Classification Search
CPC ........ G06F 21/00; G06F 21/16; G06F 21/552; G06F 21/577; G06F 21/6272
See application file for complete search history.

(56) References Cited

U.S. PATENT DOCUMENTS

| 5,956,722 A | 9/1999 | Jacobson et al. |
| 7,979,413 B2 | 7/2011 | Balachander et al. |

(Continued)

FOREIGN PATENT DOCUMENTS

| WO | 2010011182 | 1/2010 |

OTHER PUBLICATIONS

Kale, Sandip A. et al., "Data Leakage Detection," IJARCCE (Nov. 2012).

*Primary Examiner* — Alexander Lagor
*Assistant Examiner* — D'Arcy Winston Straub
(74) *Attorney, Agent, or Firm* — J. Charles Dougherty (57) ABSTRACT

Change fingerprinting is applied to a text file, database table, or data feed to determine the timeframe in which an identified "wild file" was generated, even when its file creation meta-data is missing. Each row in the data contains information on a single object. At least one column in the data contains an age for each object at the time the file was created. The age data can be used to determine the date the file was created, such as by using recognition processing or by looking at data that has been added or dropped from the file based on age. By identifying the timeframe in which the wild file was created, the data owner may greatly reduce the computational burden needed to determine if the wild file (Continued)

contains stolen data because it greatly reduces the universe of files that must be compared to the wild file.

17 Claims, 8 Drawing Sheets

(51) Int. Cl.
  *G06F 21/55* (2013.01)
  *G06F 21/57* (2013.01)

(56) References Cited

U.S. PATENT DOCUMENTS

| | | |
|---|---|---|
| 8,250,085 B1 | 8/2012 | Sourabh |
| 8,296,342 B2 | 10/2012 | Bryan et al. |
| 8,312,023 B2 | 11/2012 | Clay et al. |
| 8,549,014 B2 | 10/2013 | Acharya et al. |
| 8,930,326 B2 | 1/2015 | Cochrane et al. |
| 9,032,531 B1 | 5/2015 | Scorvo et al. |
| 9,304,980 B1 * | 4/2016 | Hartsook .............. G06F 40/197 |
| 2007/0157315 A1 * | 7/2007 | Moran ................ H04L 63/1425 |
| | | 726/23 |
| 2010/0037059 A1 * | 2/2010 | Sun ....................... G06T 1/0085 |
| | | 713/176 |
| 2010/0186067 A1 | 7/2010 | Stephenson |
| 2013/0007890 A1 | 1/2013 | De Laat et al. |
| 2014/0188921 A1 | 7/2014 | Thomason et al. |
| 2015/0128285 A1 * | 5/2015 | LaFever ................. H04L 67/02 |
| | | 726/26 |
| 2017/0109535 A1 * | 4/2017 | Kozakura ............. H04L 63/302 |

* cited by examiner

$W_i$ File Data, create date of source file unknown

| Match Key | Age Category | Income Range |
|---|---|---|
| James Taylor | 34-35 | A |
| Michael Jones | 22-23 | C |
| Susan Smith | 18-19 | G |
| AJ Foit | | I |
| Sharon Liu | 20-21 | H |
| Gail Mutoz | 28-29 | |
| David Crane | 26-27 | N |
| Jasmine Bloom | | G |
| Rosa Vazquez | 54-55 | B |
| Shelly Stein | 42-43 | G |
| Michael McCarthy | 50-51 | C |
| Helen Holtz | 52-53 | E |
| Gary Funkhauser | 32-33 | D |
| George Box | 44-45 | F |
| Alan Simmons | 22-23 | A |
| Jeffrey Altman | 28-29 | A |
| Luke Jones | 42-43 | C |

Data Provider Data File September, 2014

| Match Key | Age Category | Income Range | Gender | Education Level |
|---|---|---|---|---|
| James Taylor | 40-41 | A | M | College |
| Susan Smith | 23-24 | G | F | High School |
| Sharon Liu | 26-27 | H | F | Graduate School |
| David Crane | 32-33 | N | M | College |
| Rosa Vazquez | 60-61 | B | F | College |
| Michael McCarthy | 56-57 | C | M | |
| Helen Holtz | 58-59 | E | F | |
| Gary Funkhauser | 38-39 | D | M | College |
| George Box | 52-53 | F | M | College |
| Alan Simmons | 30-31 | A | M | High School |
| Jeffrey Altman | 36-37 | A | M | College |
| Luke Jones | 50-51 | C | M | Graduate School |

Age Category in W file looks suspiciously like Data Provider 2-year age category

$W_i$ File Data, create date of source file unknown — 20

| Match Key | Age Category | Income Range |
|---|---|---|
| James Taylor | 34-35 | A |
| Michael Jones | 22-23 | C |
| Susan Smith | 18-19 | G |
| AJ Foit | | I |
| Sharon Liu | 20-21 | H |
| Gail Mutoz | 28-29 | |
| David Crane | 26-27 | N |
| Jasmine Bloom | | C |
| Rosa Vazquez | 54-55 | B |
| Shelly Stein | 42-43 | G |
| Michael McCarthy | 50-51 | C |
| Helen Holtz | 52-53 | E |
| Gary Funkhauser | 32-33 | D |
| George Box | 44-45 | F |
| Alan Simmons | 22-23 | A |
| Jeffrey Altman | 28-29 | A |
| Luke Jones | 42-43 | C |

Data Provider Data File September, 2014 — 22

| Match Key | Age Category | Income Range | Gender | Education Level |
|---|---|---|---|---|
| James Taylor | 40-41 | A | M | College |
| Susan Smith | 23-24 | G | F | |
| Sharon Liu | 26-27 | H | F | High School |
| David Crane | 32-33 | N | M | Graduate School |
| Rosa Vazquez | 60-61 | B | F | College |
| Michael McCarthy | 56-57 | C | M | College |
| Helen Holtz | 58-59 | E | F | |
| Gary Funkhauser | 38-39 | D | M | |
| George Box | 52-53 | F | M | College |
| Alan Simmons | 30-31 | A | M | High School |
| Jeffrey Altman | 36-37 | A | M | College |
| Luke Jones | 50-51 | C | M | Graduate School |

Data Provider Current Data File September, 2014 with Age Field from $W_i$ appended — 24

| Match Key | Actual Age Category | $W_i$ Age Category | Income Range | Gender | Education Level |
|---|---|---|---|---|---|
| James Taylor | 40-41 | 34-35 | A | M | College |
| Susan Smith | 22-23 | 18-19 | G | F | |
| Sharon Liu | 26-27 | 20-21 | H | F | High School |
| David Crane | 32-33 | 26-27 | N | M | Graduate School |
| Rosa Vazquez | 60-61 | 54-55 | B | F | College |
| Michael McCarthy | 56-57 | 50-51 | C | M | College |
| Helen Holtz | 58-59 | 52-53 | E | F | |
| Gary Funkhauser | 38-39 | 32-33 | D | M | |
| George Box | 52-53 | 44-45 | F | M | College |
| Alan Simmons | 30-31 | 24-25 | A | M | High School |
| Jeffrey Altman | 36-37 | 30-31 | A | M | College |
| Luke Jones | 50-51 | 44-45 | C | M | Graduate School |

*FIG. 4*

Data Provider Current Data File September, 2014 with Age Field from $WF_i$ and DOB/Age Anchor appended, with Likely File Year Estimated

| Match Key | Actual Age Category | Date of Birth | Actual Age | 4 year-ago age | 5 year-ago age | 6 year-ago age | 4 year-ago age range | 5 year-ago age range | 6 year-ago age range | $WF_i$ Age Category | Income Range | Gender | Education Level |
|---|---|---|---|---|---|---|---|---|---|---|---|---|---|
| James Taylor | 40-41 | Jan-74 | 41 | 37 | 36 | 35 | 36-37 | 36-37 | 34-35 | 36-37 | A | M | College |
| Susan Smith | 23-24 | Feb-92 | 23 | 19 | 18 | 17 | 18-19 | 18-19 | 16-17 | 18-19 | G | F | |
| Sharon Liu | 26-27 | Mar-88 | 26 | 22 | 21 | 20 | 22-23 | 20-21 | 20-21 | 20-21 | H | F | High School |
| David Crane | 32-33 | Apr-82 | 32 | 28 | 27 | 26 | 28-29 | 26-27 | 26-27 | 26-27 | N | M | Graduate School |
| Rosa Vazquez | 60-61 | May-54 | 60 | 56 | 55 | 54 | 56-57 | 54-55 | 54-55 | 54-55 | B | F | College |
| Michael McCarthy | 56-57 | Jun-58 | 56 | 52 | 51 | 50 | 52-53 | 50-51 | 50-51 | 50-51 | C | M | College |
| Helen Holtz | 58-59 | Jul-56 | 58 | 54 | 53 | 52 | 54-55 | 52-53 | 52-53 | 52-53 | E | F | |
| Gary Funkhauser | 38-39 | Aug-76 | 38 | 34 | 33 | 32 | 34-35 | 32-33 | 32-33 | 32-33 | D | M | |
| George Box | 52-53 | Sep-63 | 52 | 48 | 47 | 46 | 48-49 | 46-47 | 46-47 | 46-47 | F | M | College |
| Alan Simmons | 30-31 | Oct-85 | 30 | 26 | 25 | 24 | 26-27 | 24-25 | 24-25 | 24-25 | A | M | High School |
| Jeffrey Altman | 36-37 | Nov-78 | 36 | 32 | 31 | 30 | 32-33 | 30-31 | 30-31 | 30-31 | A | M | College |
| Luke Jones | 50-51 | Dec-64 | 50 | 46 | 45 | 44 | 46-47 | 44-45 | 44-45 | 44-45 | C | M | Graduate School |

DOB append from recognition or other stable source

Visualization of ranging technique to determine year file was created

FIG. 5

Data Provider Current Data File September, 2014 with Age Field from $W_i$ and DOB/Age Anchor appended, with Likely File Year/Month Estimated

| Match Key | Actual Age Category | Date of Birth | Actual Age | 5 year-ago age | Jul-09 File | Aug-09 File | Sep-09 File | $W_i$ Age Category | Income Range | Gender | Education Level |
|---|---|---|---|---|---|---|---|---|---|---|---|
| James Taylor | 40-41 | Jan-74 | 41 | 36 | 36-37 | 36-37 | 36-37 | 36-37 | A | M | College |
| Susan Smith | 22-23 | Feb-92 | 23 | 18 | 18-19 | 18-19 | 18-19 | 18-19 | G | F | |
| Michelle Rogers | 26-27 | Mar-87 | 27 | 22 | 22-23 | 22-23 | 22-23 | 22-23 | H | F | High School |
| David Crane | 32-33 | Apr-82 | 32 | 27 | 26-27 | 26-27 | 26-27 | 26-27 | N | M | Graduate School |
| Rosa Vazquez | 60-61 | May-54 | 60 | 55 | 54-55 | 54-55 | 54-55 | 54-55 | B | F | College |
| Michael McCarthy | 56-57 | Jun-58 | 56 | 51 | 50-51 | 50-51 | 50-51 | 50-51 | C | M | College |
| Helen Holtz | 58-59 | Jul-56 | 58 | 53 | 52-53 | 52-53 | 52-53 | 52-53 | E | F | |
| Gary Funkhauser | 38-39 | Aug-76 | 38 | 33 | 32-33 | 32-33 | 32-33 | 32-33 | D | M | |
| Steven Box | 52-53 | Sep-62 | 53 | 48 | 46-47 | 46-47 | 48-49 | 46-47 | F | M | College |
| Jonathan Gartner | 30-31 | Oct-84 | 31 | 26 | 24-25 | 24-25 | 24-25 | 24-25 | A | M | High School |
| Jack Josephs | 36-37 | Nov-77 | 37 | 32 | 32-33 | 32-33 | 32-33 | 30-31 | A | M | College |
| Mark Miserd | 50-51 | Dec-63 | 51 | 46 | 46-47 | 46-47 | 46-47 | 44-45 | C | M | Graduate School |

{ DOB append from recognition or other stable source }

{ Visualization of ranging technique to determine month and year file was created }

| Combined Data File Containing Age DB Anchor and Age Ranges from Current File and $W_i$ File |||||||
|---|---|---|---|---|---|
| Match Key | Date of Birth | Actual Age | Age Category, Sep-2014 | Age Category, Oct-2014 | Age Category, $W_i$ file |
| James Taylor | Jan-74 | 41 | 40-41 | 42-43 | 34-35 |
| Susan Smith | Feb-92 | 23 | 23-24 | 24-25 | 18-19 |
| Sharon Liu | Mar-88 | 26 | 26-27 | 26-27 | 20-21 |
| David Crane | Apr-82 | 32 | 32-33 | 32-33 | 26-27 |
| Rosa Vazquez | Oct-54 | 60 | 60-61 | | 56-57 |
| Michael McCarthy | Jun-58 | 56 | 56-57 | | 50-51 |
| Helen Holtz | Jul-56 | 58 | 58-59 | 58-59 | 52-53 |
| Gary Funkhauser | Aug-76 | 38 | 38-39 | 38-39 | 32-33 |
| George Box | Sep-63 | 52 | 52-53 | 52-53 | 44-45 |
| Alan Simmons | Oct-85 | 30 | 30-31 | 30-31 | 22-23 |
| Jeffrey Altman | Nov-78 | 36 | 36-37 | 36-37 | 28-29 |
| Luke Jones | Dec-64 | 50 | 50-51 | 50-51 | 42-43 |
| Lisa Debeers | Oct-92 | 22 | 20-21 | 22-23 | 18-19 |

*FIG. 8*

CHANGE FINGERPRINTING FOR DATABASE TABLES, TEXT FILES, AND DATA FEEDS

TECHNICAL FIELD

This invention addresses issues of data privacy and forensic analysis of data files using content-based zero-watermarking techniques to determine the date a file was created.

BACKGROUND ART

Owners of data (each a "Data Provider") often give, lease, or sell their data to individuals or organizations that are supposedly trusted to handle that data in a legal fashion ("Trusted Third Parties" or "TTPs"). The TTPs are obligated to follow contractual requirements or data-handling regulations, such as Regulation B in financial services or privacy laws set by local, state or federal government. This data is usually transmitted to the TTPs as a series of database tables (.sql), text files (.csv, .txt. or other format), or as a real-time data feed (e.g., XML or JSON). Despite this, the Data Provider's data may leak (the leaked file is defined as a "Leaked Subset") into the hands of others ("Bad Actors") who either knowingly or unknowingly use the data illegally. This can happen because a TTP knowingly releases the data, an employee of the TTP knowingly or accidentally releases the data, or an employee of the actual Data Provider knowingly or unknowingly leaks the data.

Once the Data Provider's data leaks, it can be manipulated by Bad Actors in numerous ways: elements can be altered, it can be merged with data from other Data Providers, or it can be broken into subsets or rearranged, among other types of manipulation. This makes it difficult for the Data Provider to recognize the data as its own, identify the party responsible for leaking the data, and recover lost revenue in a court of law.

The applicant has developed systems and methods in hardware and software for watermarking data sets to identify a Leaked Subset and identify which TTP or TTPs were the Bad Actors ("Guilt Assignment"), as disclosed in co-pending international patent application number PCT/US2016/068418. This system and method solves for two problems, outbound processing and inbound processing. Outbound processing refers to the association of unique data with each outbound data subset from a Data Provider (also known as a "watermark" or a "fingerprint" depending on the technique used) so that the data contained in any Leaked Subset, even if altered in some way, can still be identified as coming from the data provider and that specific file. Inbound processing allows the Data Provider to then track the flow of data back to a specific TTP so that a probability that it is the likely source of the Leaked Subset can be assigned and its guilt determined in a way that can be enforced in a court of law. This requires the ability to take a data file acquired from a third party (a "Wild File") that realistically could contain a Data Provider's data, whether or not the third party is known to be a Bad Actor, and process it in a way that the data can be recognized as coming from a specific data file, from a specific TTP. The problem for inbound processing in making this determination is that it is necessary for the Data Provider (or their agents, such as a third-party service) to match the data contained in the Wild File with the matching Leaked Subset from a specific TTP. In a commercial system that provides data fingerprinting and guilt assignment, each TTP may receive hundreds of files a month over the course of many years, and there may be thousands of TTPs. Making a match to a single file in a universe of millions files through a brute force approach where a comparison is made to every file would be computationally expensive, if not impossible, with today's technology.

An example will give a sense of scale to this problem. Assume a Data Provider ships 200,000 files a year over 10 years, representing 2,000,000 total files shipped (the "File Universe"). Also assume that it takes one hour to determine if a specific file is the source of the leaked data in a specific Wild File. If one is required to search the entire file universe, it would take 2,000,000 hours, which equates to 228 years. It may be further noted that this example ignores the fact that any Data Provider may be processing multiple Wild Files acquired from multiple sources at the same time. A solution that takes this long is obviously useless.

It may be seen then that a system and method that allows the Data Provider to determine if a Wild File matches a specific Leaked Subset in a reasonable period of time that makes undertaking data fingerprinting worth doing in the first place would be highly desirable.

DISCLOSURE OF INVENTION

The invention is directed to systems and methods that utilize change fingerprinting. Change fingerprinting may be defined as a process that can be applied to any text file, database table, or data feed generated by a specific software program that allows it, or associated programs, to determine a posteriori the timeframe (e.g., the month and year) in which the file was generated, even when its original creation date is unknown. By doing this, the problem space described above is reduced to a reasonable number of files to make Guilt Assignment possible in a reasonable period of time. In the example above, the problem space for matching is reduced from a file universe of two million files to 16,666 files needed for comparison. This reduces the problem space to something manageable where hardware or other forms of system scaling can be used to match the Wild File to a specific Leaked Subset.

When any file or stream of text is generated by a software system, the date and time of its creation is generally recorded. This information may be found, for example, in the details available through Windows file explorer or by the ls command in Linux. A problem arises, however, when the file is given to a third party and, either intentionally or unintentionally, all meta-data (e.g. variable names, value labels) contained within the file is stripped away and the file name is changed or, alternately, the data in the file is manipulated (e.g. recoded, such as altering the variable name and changing values from 1-10 to A-J) and the file saved under another name with different meta-data (e.g., altered variable names and value labels). The most likely situations in which this occurs are data theft from a software-based system or, alternately, when a file containing data from that system is handed in the clear to a TTP, and then that TTP manipulates the file and its data to intentionally obfuscate its ownership/generation from the specific software program. These two scenarios are within the definition of the term "data leakage", and while they represent the two most likely scenarios, this invention is meant to cover any use case where data leakage and the concomitant loss of file-identifying information may occur.

In certain implementations of the invention, the text file, data table, or data feed consists of rows of records, or a string of records in the case of an XML or JSON feed. Each row contains data on a single object—for example, personal information on a single consumer (e.g., unique user id, name, address, demographic information, etc.) or production information on items (e.g., manufacturer, make, model features). In both examples, at least one column contains a "valid" age for each object at the time the file was created. A valid age is one that can be verified against a Date of Birth or Production Date, although the invention also covers the case where a date of birth or production date "anchor" may not be available. In this case, one or more secondary columns containing data that changes in some predictable way over time can be used as an alternate "anchor" to triangulate a valid age for a specific Wild File. For purposes of these implementations of the invention, an individual item in the Wild File can be identifiable via a name, address, etc., or other id, as long as the record contains a persistent and unique identifier (e.g., Acxiom Corporation's ConsumerLink variable) that does not change over time.

Once a Bad Actor is suspected of using a Leaked Subset, the Data Provider can resort to legal means to stop the leak and recover lost revenue. As part of the process, the Data Provider often has a contractual right to audit a TTP suspected of misusing data. However, many TTPs may have been receiving hundreds of data files a month for a long period, such as a decade or more, so the problem becomes difficult due to scale. Lacking any mechanic for bounding the search, the Data Provider would be required to go through emails, documents, spreadsheets and other physical documentation for the entire period during which data files were sent to try to discover where, when, and how the leak occurred. The cost of such discovery would be substantial and prohibitive in terms of time required for litigation and effort/money spent on the discovery process. If the search space could be restricted to one month, as opposed to twelve, 92% of the search space is eliminated. If data is retained for more than a year then the search space reduction is even greater. It may be seen then that there is a need to restrict the search space for discovery to speed litigation and lower costs. These are two problems this invention addresses. This invention specifically applies to the inbound processing portion of the machine, as well as to certain elements of legal discovery.

These and other features, objects and advantages of the present invention will become better understood from a consideration of the following detailed description of the preferred embodiments and appended claims in conjunction with the drawings as described following:

BRIEF DESCRIPTION OF DRAWINGS

FIG. 4 illustrates a merge of the $W_i$ wild file with the current data file according to an implementation of the invention.

BEST MODE FOR CARRYING OUT THE INVENTION

Before the present invention is described in further detail, it should be understood that the invention is not limited to the particular embodiments and implementations described, and that the terms used in describing the particular embodiments and implementations are for the purpose of describing those particular embodiments and implementations only, and are not intended to be limiting, since the scope of the present invention will be limited only by the claims.

Figure 1:
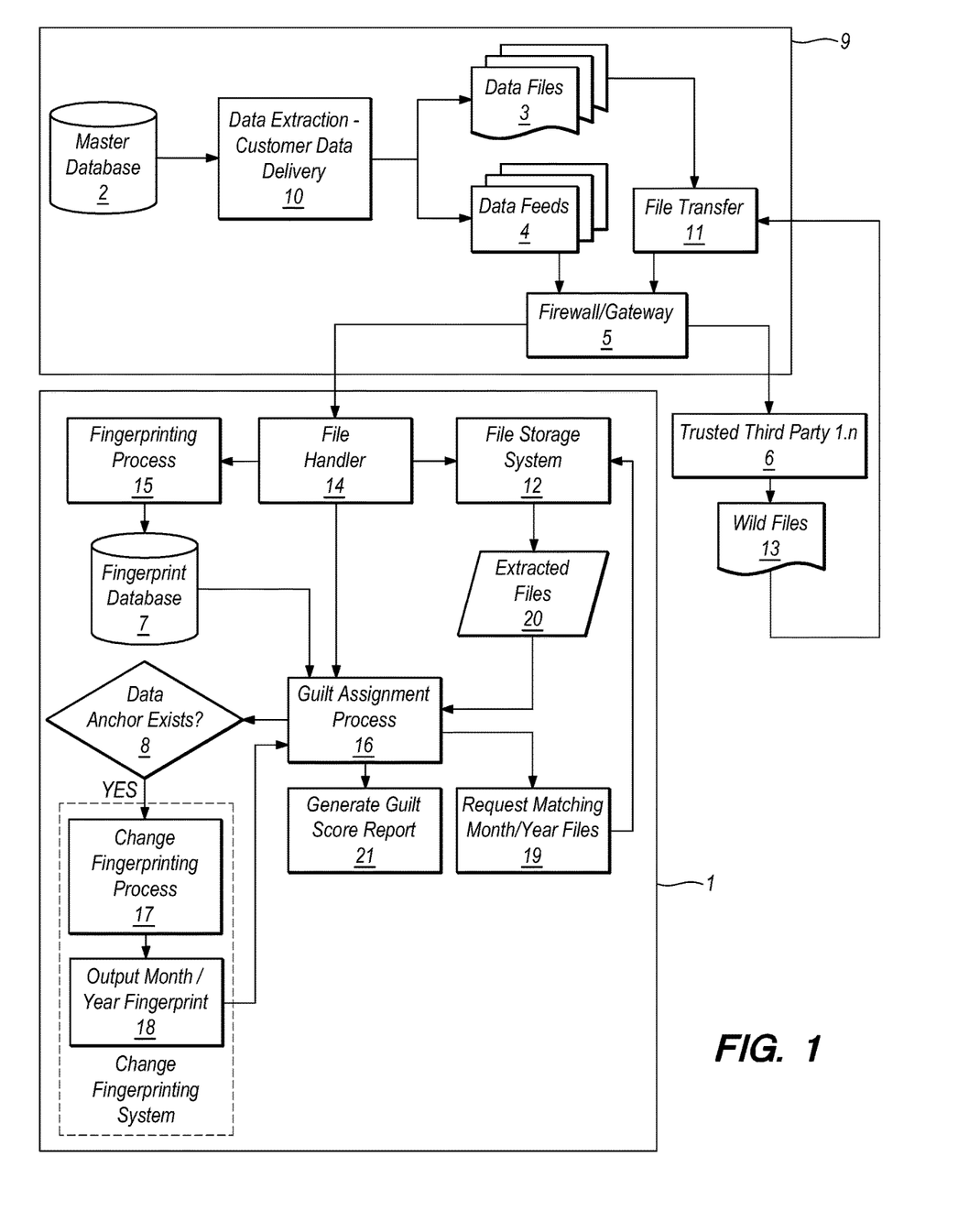
FIG. 1 illustrates the overall conceptual framework and design for a change fingerprinting system according to an implementation of the invention.

FIG. 1 shows the overall system flow, including the Data Owner environment 9 and the data fingerprinting system 1. The Data Owner environment 9 denotes clients, including Data Owner internal clients who use the data fingerprinting system. It is included in this document to provide context for the present discussion and to illustrate the end-to-end data flow. The main system components are numbered and correspond to the brief description below.

- 10—Data Extraction—Customer Data Delivery. This is the process where the Data Provider extracts data from its master database 2, output as data files 3 or data feeds 4 to deliver or distribute to third parties.
- 11—File Transfer. This is the specific data transfer mechanic (e.g., SFTP) employed by the Data Provider to transmit data to Trusted Third Parties 6. It interacts with TTPs 6 through firewall 5.
- 12—File Storage System. This is the beginning of the data fingerprinting system. The Data Provider submits a copy of all data files and data feeds delivered to third parties to the file storage system 12.
- 13—Wild file. When a wild file is uncovered by the Data Provider the file is transmitted to the data fingerprinting system at file transfer 11.
- 14—File Handler. The system detects a new file in the system and triggers the file handler process.
- 15—Fingerprinting Process. The system copies the new file to the database server's file system and loads the wild file into the fingerprint database 7.
- 16—Guilt Assignment Process. The user kicks off the guilt assignment process for the wild file. The system parses the file and checks if a date anchor exists at decision block 8. If at least one date anchor exists the system executes the change fingerprinting process 17.
- 17—Change Fingerprinting Process. This subsystem will be described in detail below.
- 18—Output Month/Year Fingerprint. The system returns the estimated date(s) of the wild file in month and year to the guilt assignment process 16.
- 19—Request Matching Month/Year Files. The guilt assignment process 16 executes a request to retrieve data files from the month and year from step 18.
- 20—Extracted Files. The system extracts the files per request in request matching month/year files step 19 for the guilt assignment process 16.
- 21—Generate Guilt Score Report. The guilt assignment process 16 generates a guilt score for the wild file 13.

Figure 2:
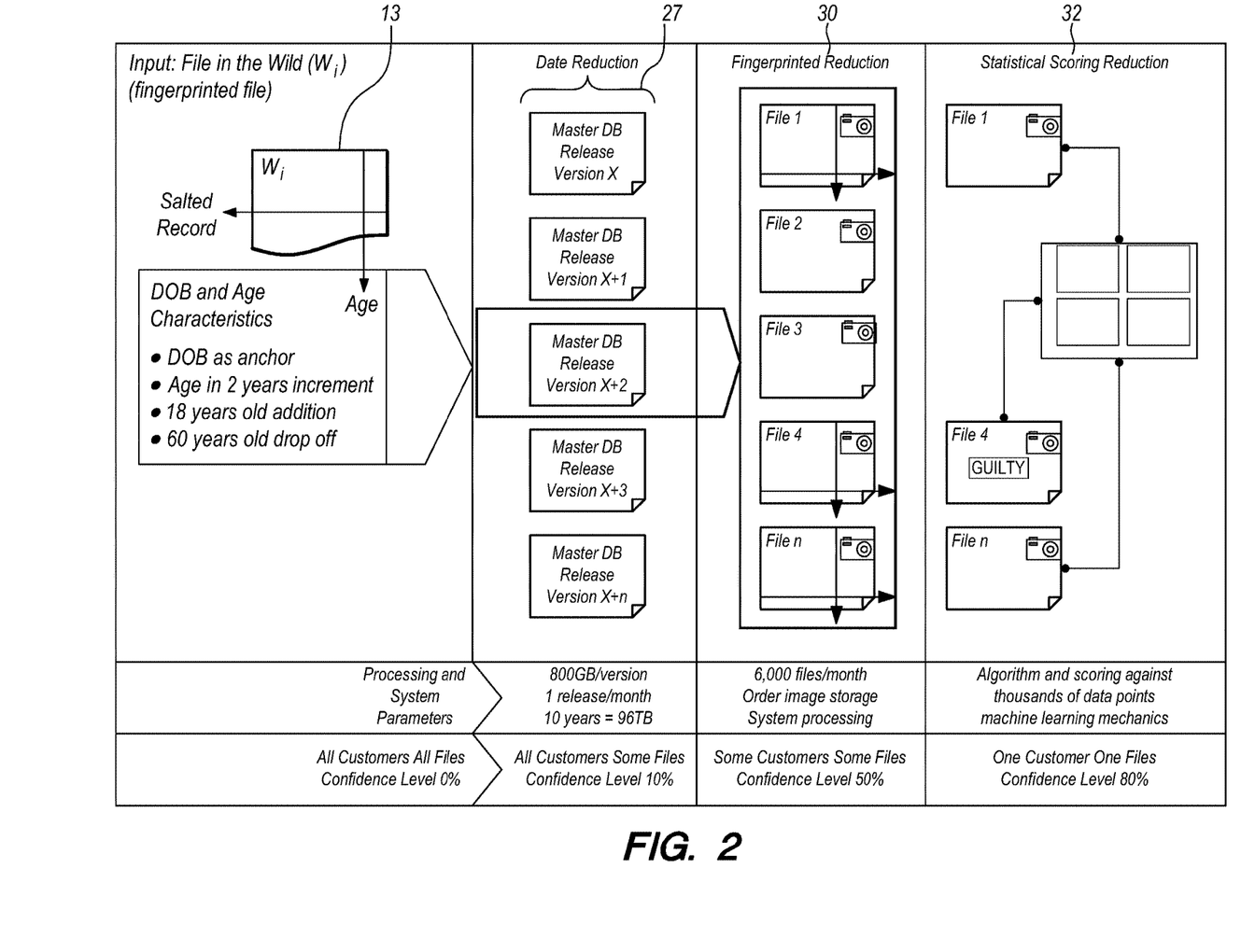
FIG. 2 illustrates the system reduction mechanics for a watermarking system according to an implementation of the invention.

FIG. 2 shows the general system design for the reduction mechanics involved in processing a wild file 13 to determine which TTP 6 originally received the file from the Data Owner. In this example, the wild file 13 input to the system has age related information, as well as date of birth (DOB) as an anchor. Age-related information includes age in two-year increments, new 18 year olds added on a monthly basis, and records for those older than 60 possibly being suppressed. Accurate, consistent, and persistent DOB is provided through a service provider's recognition process, such as the AbiliTec service from Acxiom Corporation, where personally identifiable information (PII) (e.g., name and address) from the wild file 13 is matched against the service provider's data. At this point the wild file 13 could be derived from any of the files that have gone out to the Data Owner's customers over the entire period of the Data Owner's records retention, which in this example is ten years.

The date reduction process described in this implementation of the invention allows the wild file 13 to be dated to the month and year it was created. With each monthly file release in this example assumed to be approximately 1 TB in size, the total for all monthly releases for the last ten years of retained files would be approximately 120 TB. Narrowing the search space to one year out of ten reduces the search space by 90%, but reducing it to one month out of ten years of monthly data eliminates over 99% of the search space. At this point the file could originate from any customer receiving files for the particular month/year. This processing is shown at step 27 of FIG. 2.

The fields and individuals associated with a customer order provide a unique fingerprint that acts as an additional reduction mechanism, since each fingerprint is unique and tied to each TTP. As one example, the horizontal salting procedure described in the applicant's co-pending international patent application no. PCT/US2016/068418, which is incorporated herein by reference, permits a file to be associated with a specific Data Owner client and a TTP with whom the Data Owner has shared their data. The result is a further reduced set of files at step 30 in this Figure. At this step in the process, the wild file 13 can be ascribed to a file received by a specific customer in a specific month/year.

The final reduction mechanic occurs through statistical comparisons of the properties of variables in the wild file 13 with those from the Data Provider file that went to the specific customer, which occurs at step 32. While it is possible for a Bad Actor to change variable names and how values are labeled, it is much more difficult to alter the statistical properties of the variables per se. Two files from the same month based on the same individuals, and with the same variables, should be statistically the same. Statistically similar means the probability density functions of continuous variables and the probability mass functions of categorical variables should be the same. Likewise, bivariate and multivariate relationships among the variables in the files should be essentially the same. A guilt score may thus be created (in a range, for example, of 0 to 1) that provides a numeric measure of the strength of association between the wild file 13 with the identified Data Provider file. At the most simple level, the guilt score may correspond to the percentage of rows in wild file 13 that are found in the Data Provider file. Other considerations in generating the guilt score may be, for example, the percentage of the variables in wild file 13 that are in the source file; the percentage of the variables in wild file 13 that are also in the source file and have the same metadata characteristics; whether the variable names and levels are exactly the same or have been recoded; and, even in the absence of identical variable names and labels, whether the probabilistic characteristics of variables are statistically the same or similar.

Basic Concept: Change Fingerprinting with an Available DOB (or Similar) Anchor

Figure 3:
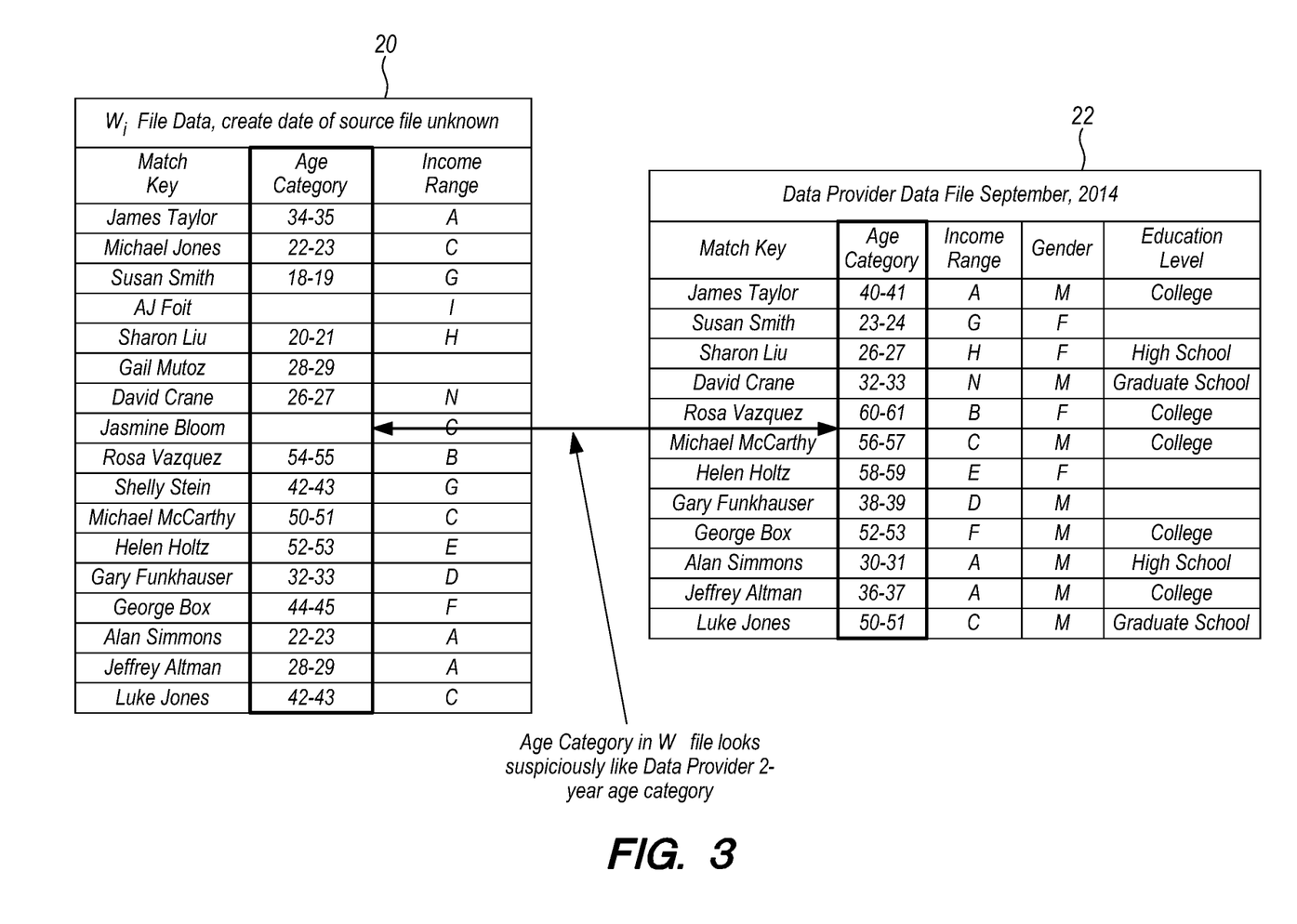
FIG. 3 illustrates two example files for comparison, a $W_i$ wild file and a current data file, according to an implementation of the invention.

Referring now to FIG. 3, change fingerprinting process 17 can be described in greater detail. Consider a specific wild file ($W_i$) 13 with data as shown in table 20 that was been acquired through some mechanic, such as an active file acquisition program or a government agency bringing a file to the Data Provider and asking them if this is their data. On the right side of the diagram is the latest Data Provider File (D) that has been produced 22, in this case for September, 2014. Each row in the file represents a unique individual, and most people have a value for a two-year age range. Age changes each year, and since birthdays are distributed across a year, each month when D is updated the ages of some individuals advance by one year.

To reduce compute cycles, the Data Provider wants to minimize the number of potential core data files it must compare the wild file 13 against to determine if any of the data in the wild file originates from D. The wild file $W_i$ 13 contains a field that indicates age of head of household in two-year increments, and it looks suspiciously like the age in two-year increment field in D. To ascertain their equivalence, the Data provider uses match keys on a random sample subset of $W_i$ 13 to match against the Data Provider's current file, and incorporate the two age fields into a single table 24, as shown in FIG. 4.

Once single table 24 is created, the Data Provider applies a recognition process to table 24 (e.g., Acxiom Corporation's AbiliTec service) and acquires these individuals' DOBs, the best information about their current age based on original legal documents such as birth certificates, passports, government issued identification, and so on. By taking the difference between current true age, as defined against a fixed, stable reference like DOB, and the age range in the matched rows from the $W_i$, the system can predict the most likely date, specifically year and month, of the Data Provider's source file from which the data in the $W_i$ may have been obtained. This can be done in a one-step process (not shown) or in a two-step process, as shown in FIGS. 5 and 6.

Figure 5:
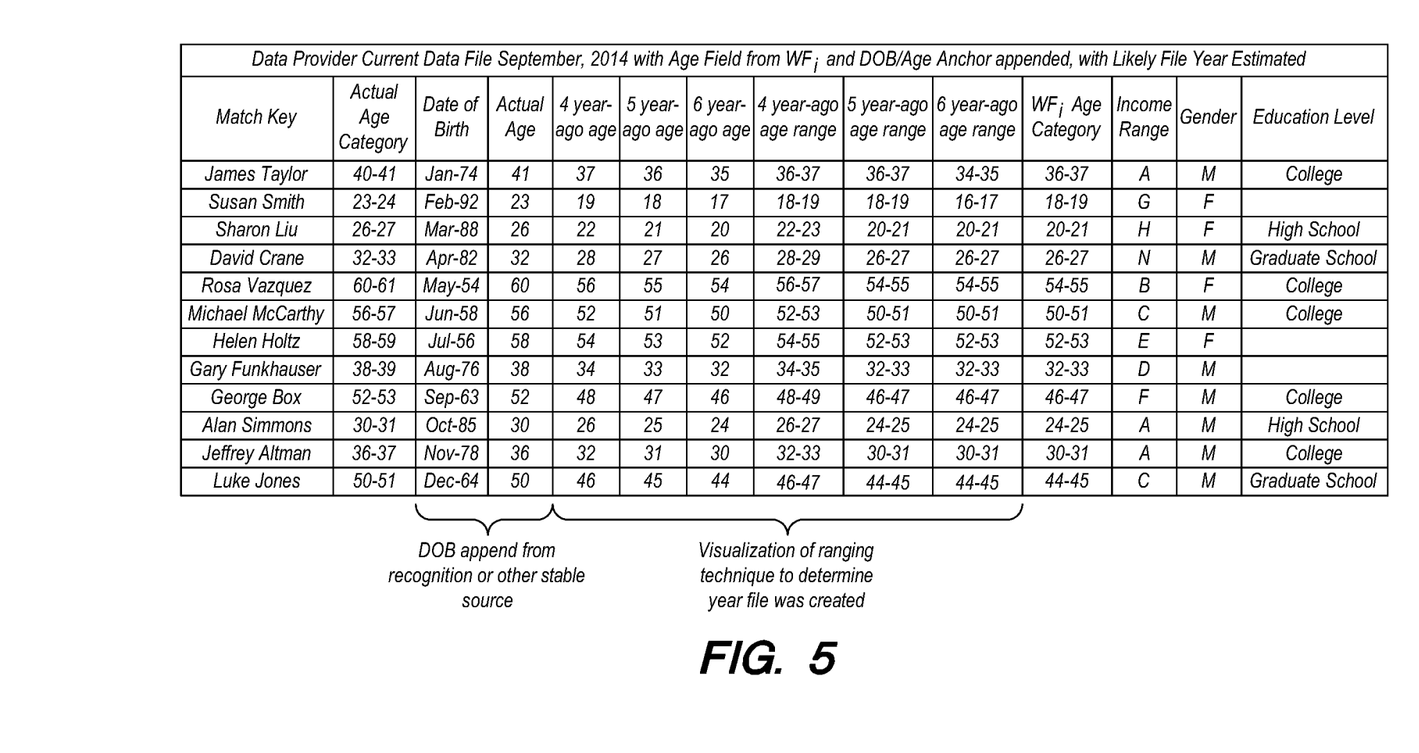
FIG. 5 illustrates the determination of file year using the change fingerprinting system according to an implementation of the invention.
Figure 6:
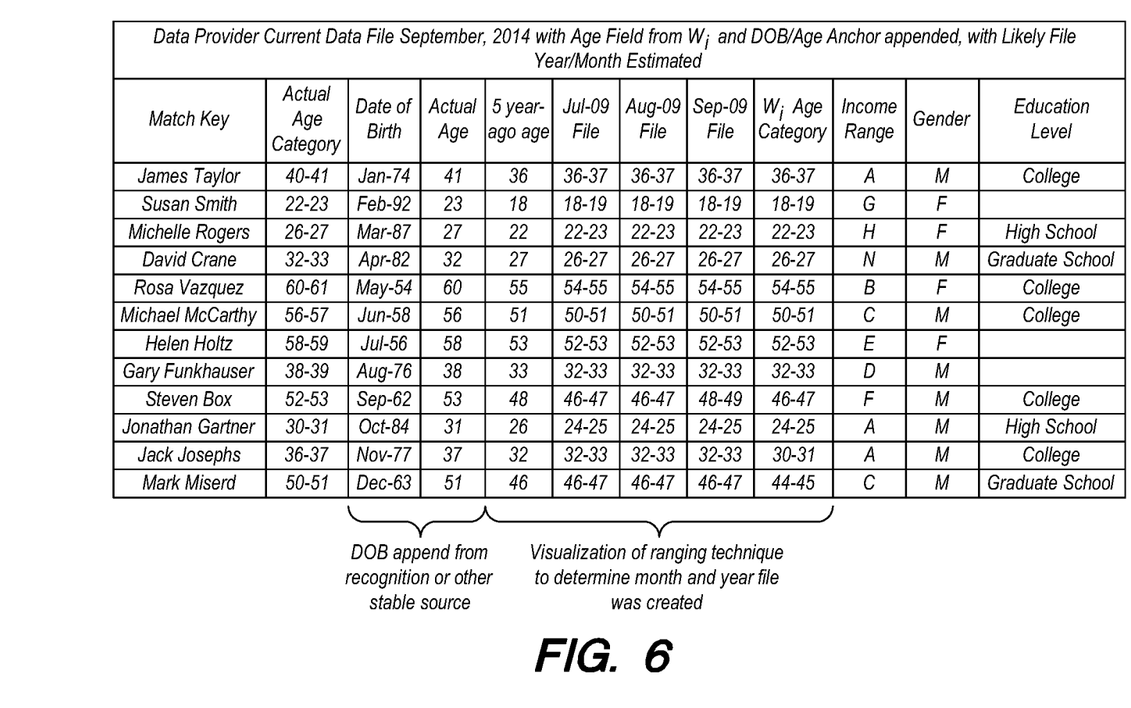
FIG. 6 illustrates the determination of file month and year using the change fingerprinting system according to an implementation of the invention.

FIG. 5 shows an example of ranging for the year, while FIG. 6 shows an example of ranging for month-year, and how the wild file date can be established as August of 2009 in a particular example. One of the individuals shown, Steven Box, had a birthday in September, and his age changed. But the ages for Jack Joseph and Mark Miserd, with birthdays in November and December, respectively, did not change. Stevens's age shows as 46-47, Jack's as 30-31, and Mark's as 44-45, and given their birth months, it may be deduced that the file date must be August of 2009.

Change Fingerprinting Without DOB or Similar Anchor as a Stable Reference

In an alternative implementation of the invention, it is possible to execute the same process as described above without reference to a date of birth from AbiliTec or other recognition source. If we assume that the data in any Data Provider's master data set 2 is accurate with a high level of precision, independent of being tied to a DOB anchor, then we can build a DOB reference column from twelve sequential files generated from a common (master) data source, like Acxiom Corporation's InfoBase. This is essentially a reverse birthday append to the files by watching the months in which ages change. That yields birth months and years for each individual in the master data source. After creating that reference column, the Change fingerprinting mechanic can then be applied.

File Dating Lacking Accurate Information from the Data Provider

Age information is often acquired by third-party data providers, and even first parties, from sources such as web forms, where people do not put their true age. The result is that ages in a wild file $W_i$ could be highly inaccurate, lacking a DOB anchor to validate against.

At the time a specific Wi file 13 is acquired, the Data Provider does not know if any included age data is from D, hence there is no guarantee that the data in the file is accurate on an individualized basis. In this case, they use the same mechanic against a DOB anchor, but only keep age matches on recognized individuals. This means they have matched the records and put them through some type of recognition process, where the ages between the two files are the same (for one-year increments) or, in the case of two-year ranges, where the age ranges are the same. The rest of the data is considered "tainted" and is discarded. Most files are large enough that even if the data in the $W_i$ file 13 did not come from D and even if the data is not of high quality, the Data Provider should be able to get a large enough sample that does match to be able to identify the month/year in which the source file was created.

This use case is important when the service is provided by the Data Owner to third parties. It allows the provider to date the source file for wild files (Wi's) 13 suspected of containing those third parties' data.

Additional Change Fingerprinting Mechanic—Added and Deleted Records

Change fingerprinting has a second mechanic, layered on top of the one described previously, which helps triangulate the month and year of the correct $S_{j,t}$. This mechanic takes advantage of the fact that records are added to or deleted from $S_j$ as it is created and then refreshed at times t, t+1, t+2 . . . t+n. In the case of consumer data files, people are typically added when they turn 18, and removed once they are 61 or are deceased. As a result, one can treat those additions and deletions as a specific type of salted record ("natural salted records") that allows the Data Owner to more accurately determine the month and year of a specific file.

Figure 7:
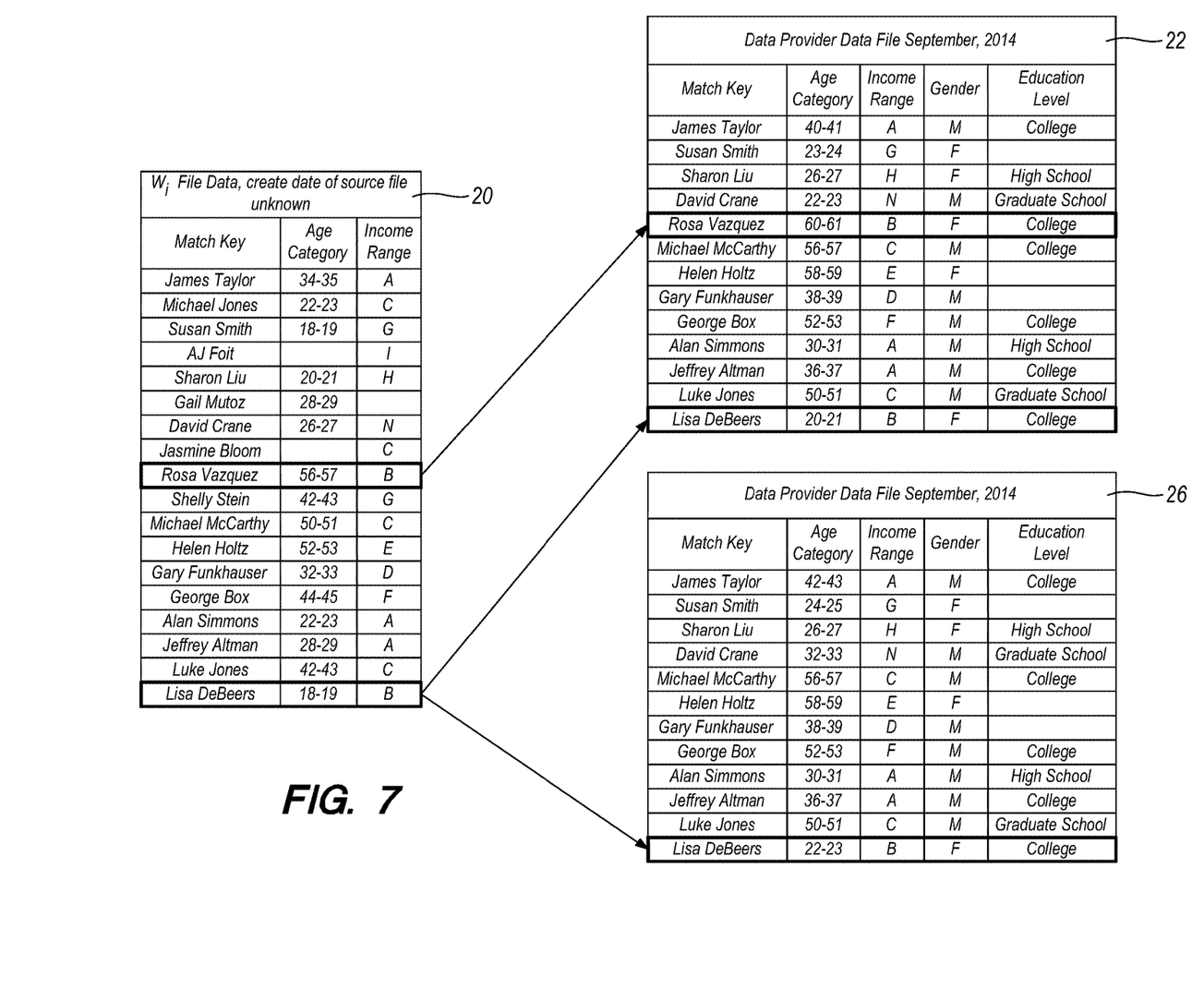
FIG. 7 illustrates a comparison of a $W_i$ wild file with two files of known date according to an implementation of the invention.

FIG. 7 serves to illustrate the use of naturally salted records. In this example, there are three files: on the left a wild file Wi with data 20 suspiciously resembling data from the Data Provider, and on the right two files from the Data Provider, created in September and October of 2014, denoted as Data Provider files 22 and 26, respectively. Note that Rosa Vasquez has been deleted from the October 2014 file 26 (because she turned 61), and Lisa DeBeers has had a birthday between the September and October files.

Figure 8:
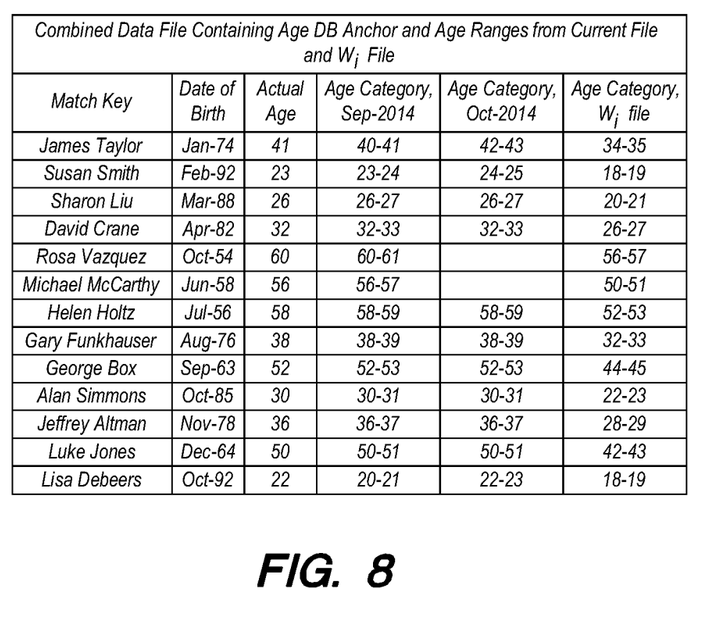
FIG. 8 is a table containing merged example data from two current Data Provider files of known date and a $W_i$ wild file of unknown date according to an implementation of the invention.

These files 20, 22, and 26 from FIG. 7 are combined, the Date of Birth anchor appended, and the current actual age determined, as shown in FIG. 8. Two features emerge from this comparison. First, Rosa Vasquez appears in the wild file $W_i$ 13, which means the data could not have come from the October, 2014 file. In addition, Lisa DeBeers could only have been added to the file when she turned 18 (which is shown in the $W_i$ file 13). In the wild file $W_i$ 13, she is in the 18 to 19 age interval, meaning the $S_j$ had to come either from 2010 or 2011. However, given that her real age is 22 and she has just had a birthday between September and October, we know that the wild file $W_i$ 13 must have come from a $S_{j,t}$ of September 2010. This is consistent with Rosa Vasquez being in the $W_i$ file 13. One may therefore conclude that the $S_{j,t}$ for the $W_i$ file 13 is the September, 2010 file.

One additional observation has to do with the primacy of new records for 18 year olds added to the Data Owner's consumer database on a monthly basis. Consider the situation where the Data Owner recovers a wild file 13 from the Internet or other electronic media. As a file ages on a monthly basis, the number of 18 year olds decreases by about 8% each month. After one year, there will be no 18 year olds remaining in the file. Carried to the extreme, after two years there will be no 18 or 19 year olds, and so on. Using an identity recognition process as described above, PII from the wild file 13 is used to match against the Data Providers master file 2, and true DOB is appended. If the wild file 13 is a representative statistical sample of the Data Providers file, simply sorting the wild file 13 by DOB from oldest to most recent provides the date (month and year) of file creation. The most recent DOB dates will be for the most recently added 18 year olds. If the wild file 13 is from the current month, say November of 2016, the most recent DOB on the file will be November of 1998, exactly 18 years ago. If the most recent DOBs on the file are from March of 1998, the wild file 13 was created in March 2016. If the wild file 13 was created in July of 2010, the latest DOB on the file would be July 1992. This mechanism can be used for quickly determining file creation date, and serves as an alternative validation to the main proposed DOB mechanism.

Additional Change Fingerprinting Mechanic—Changed Records

The change fingerprinting process can also be extended, in an alternative embodiment of the invention, to any change in a database field occurring between two dates, as long as an audit trail of original files is maintained. For example, if Lisa DeBeers was shown as unmarried in July 2010 but married in September 2010, and if she was shown as married in the $W_i$ 13 (she was a child bride), it would serve as another signal that the original $S_{j,t}$ could not have predated September 2010. As such, the accuracy of the prediction by ranging on the earlier timeframe of the $S_{j,t}$ (whereas the loss of Rosa Vasquez ranges on the later timeframe) is reaffirmed.

Files for which the Invention is Applicable

Although the implementations of the invention described above focus on data files containing consumer data that may have age-related fields, the invention is not so limited. In alternative implementations, types of data files that might contain this data include:

Files from third-party consumer data providers
First-party customer relationship management (CRM) files containing customer information for specific merchants
Airline or other travel reservation files where passenger age or DOB is captured
Consumer health records
Files from loyalty programs
Corporate personnel records
Government tax files and other government records (e.g., Social Security Administration records, passport records)
Academic records Other Categories of Data The lack of a dependable age anchor is usually not an issue for data tables containing information about "hard goods" like dishwashers, plumbing pipes, watches, stereos, and televisions, among many others, where a product date, warranty date, batch id, and batch ship dates are inherent in a file, or ages of the product vary less than in typical consumer data. Take for example data on used cars on a website dealer such as autotrader.com. The model year of the car is known from the $10^{th}$ digit of the Vehicle Identification Number, so if a data file containing car ages was stolen and Edmunds wanted to know if the data came from their databases and if so when (the month and year), it would be unlikely that the underlying age data is inaccurate or that a Bad Actor could manipulate that specific feature without the tampering being evident.

For soft goods (e.g., clothing) or goods from continuous processes (e.g., petrochemicals or steel), age tends not to be something that is relevant. Even though a file would likely have a batch id and order date, there is no age measure that can be used. Note also, but as an aside, these types of goods tend not to have warranties or be associated with a specific individual, so it is unlikely data stolen from these types of producers would have value in a larger market for illicitly obtained data that would make it worth watermarking.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A method for determining a source for data found in a wild file, the wild file comprising a plurality of records, the method comprising the steps of:
   a. identifying a field with person age information on the wild file records;
   b. applying a recognition process to the wild file records, wherein personally identifiable information (PII) from the wild file records is matched against corresponding fields in a data owner's master file to append true person age data to the wild file records;
   c. comparing the true person age data to the person age information from the wild file records to identify a wild file creation period;
   d. in a master database of all source data files transmitted over a file retention period, selecting only those data files sent during the wild file creation period;
   e. comparing only the selected data files to the records in the wild file to determine if the wild file matches any of the selected data files; and
   f. generating a guilt score for the wild file that represents its strength of association with the corresponding data file.

2. The method of claim 1, wherein the person age information is a date of birth.

3. The method of claim 1, wherein the person age information is a manufacturing date.

4. The method of claim 1, wherein the person age information is an age range.

5. The method of claim 4, wherein the true person age data comprises an age range of two years.

6. The method of claim 4, wherein the step of identifying a field with person age information on the wild file records comprises the step of identifying a field in the wild file that contains an age range, and wherein the step of comparing the true person age data to the person age information from the wild file records to identify a wild file creation period comprises the step of comparing files released in multiple months to the data of the wild file to identify a month when an age range changed for at least one of the records.

7. The method of claim 6, wherein for each of the records if the step of applying a recognition process to the record in the data of the wild file does not result in a match, then the record is discarded for further processing.

8. The method of claim 1, wherein the step of applying a recognition process comprises the identification of true person age data derived from original legally accepted documents.

9. The method of claim 1, wherein the step of selecting only those data files corresponding to the wild file creation date comprises the steps of first selecting only those data files sent during a given year and then selecting from among those files sent during a given year those data files sent during a given month.

10. The method of claim 1, wherein the step of selecting only those data files corresponding to the wild file creation date comprises a single step of selecting only those data files sent during a given year and a given month.

11. A method for determining a source for data found in a wild file, the method comprising the steps of:
   a. identifying in the wild file a field comprising person age information;
   b. in a master database of all data files transmitted over a file retention period, selecting only those data files sent during the period the wild file was created based on the person age information;
   c. comparing only the selected data files to the records in the wild file to determine if the wild file matches any of the selected data files; and
   d. generating a measure of association between the wild file and a potential source file.

12. The method of claim 11, wherein the person age information comprises an age range.

13. The method of claim 12, wherein each of the data files was released in a different month of a given year.

14. The method of claim 13, wherein the data files comprises twelve data files, and wherein each of the twelve data files was released in a different month of the given year.

15. A method of determining the age of a wild file using a plurality of data files, wherein each of the wild file and data files comprise a plurality of records pertaining to individuals, each record comprising a plurality of fields, the method comprising the steps of:
   a. comparing the records of the wild file to the records of each of the plurality of data files to identify any records in the wild file that are found in at least one of the plurality of data files but not all of the plurality of data files;
   b. applying a recognition process to the records in the wild file, wherein personally identifiable information (PII) from the records in the wild file is used to find a date of birth related to each of the records in the wild file;
   c. for each of the plurality of data files that contains a record that is missing from the wild file, determining that the age of the wild file is older than such data file; and d. for each of the plurality of data files that do not contain a record that is present in the wild file, determining that the age of the wild file is younger than such data file.

16. A method of determining the age of a wild file, wherein the wild file comprises a plurality of records pertaining to individuals, each record comprising a plurality of fields, the method comprising the steps of:
   a. applying a recognition process to the records in the wild file, wherein personally identifiable information (PII) from the records in the wild file is used to find a date of birth related to each of the records in the wild file and appending the date of birth to each of the records in the wild file;
   b. after applying the recognition process, sorting the records in the wild file according to date of birth and identifying the records with the most recent date of birth; and
   c. adding a set age to the date of birth to calculate the age of the wild file.

17. The method of claim 16, wherein the set age is eighteen years.

* * * * *